United States Patent
Wanninger et al.

(10) Patent No.: US 9,221,038 B2
(45) Date of Patent: Dec. 29, 2015

(54) METAL-CONTAINING CRYSTALLINE SILICATES

(75) Inventors: Klaus Wanninger, Kolberrnoor (DE); Arno Tissler, Tegernheim (DE); Anna Omegna, München (DE); Andreas Pritzl, Bad Aibling (DE)

(73) Assignee: Sued-Chemie IP GmbH & Co. KG, Munich (DE)

( * ) Notice: Subject to any disclaimer, the term of this patent is extended or adjusted under 35 U.S.C. 154(b) by 718 days.

(21) Appl. No.: 13/129,005

(22) PCT Filed: Nov. 13, 2009

(86) PCT No.: PCT/EP2009/008104
§ 371 (c)(1),
(2), (4) Date: Jul. 27, 2011

(87) PCT Pub. No.: WO2010/054832
PCT Pub. Date: May 20, 2010

(65) Prior Publication Data
US 2011/0274602 A1  Nov. 10, 2011

(30) Foreign Application Priority Data

Nov. 13, 2008 (DE) .......................... 10 2008 057 134

(51) Int. Cl.

| | |
|---|---|
| *B01J 29/06* | (2006.01) |
| *B01J 29/87* | (2006.01) |
| *B01D 53/94* | (2006.01) |
| *B01J 29/035* | (2006.01) |
| *B01J 29/86* | (2006.01) |
| *B01J 29/89* | (2006.01) |
| *B01J 35/00* | (2006.01) |
| *B01J 37/02* | (2006.01) |
| *B01J 37/18* | (2006.01) |
| *C01B 39/08* | (2006.01) |
| *C01B 39/12* | (2006.01) |
| *B01J 23/42* | (2006.01) |
| *B01J 23/62* | (2006.01) |

(52) U.S. Cl.
CPC .............. *B01J 29/87* (2013.01); *B01D 53/944* (2013.01); *B01J 29/035* (2013.01); *B01J 29/86* (2013.01); *B01J 29/89* (2013.01); *B01J 35/002* (2013.01); *B01J 37/0215* (2013.01); *B01J 37/0246* (2013.01); *B01J 37/18* (2013.01); *C01B 39/082* (2013.01); *C01B 39/085* (2013.01); *C01B 39/12* (2013.01); *B01D 2255/1021* (2013.01); *B01D 2255/20707* (2013.01); *B01D 2255/30* (2013.01); *B01D 2255/50* (2013.01); *B01D 2258/012* (2013.01); *B01J 23/42* (2013.01); *B01J 23/62* (2013.01); *B01J 2229/16* (2013.01); *B01J 2229/18* (2013.01); *B01J 2229/183* (2013.01); *B01J 2229/186* (2013.01); *B01J 2229/40* (2013.01)

(58) Field of Classification Search
USPC ................................................ 502/60, 74, 61
See application file for complete search history.

(56) References Cited

U.S. PATENT DOCUMENTS

| | | | | |
|---|---|---|---|---|
| 4,268,420 | A | | 5/1981 | Klotz |
| 4,331,774 | A | * | 5/1982 | Boersma et al. .............. 518/714 |
| 4,410,501 | A | | 10/1983 | Taramasso |
| 4,725,570 | A | | 2/1988 | Sikkenga |
| 4,899,006 | A | * | 2/1990 | Dave et al. .................... 585/415 |
| 5,003,125 | A | | 3/1991 | Giusti |
| 5,026,938 | A | | 6/1991 | Shum |
| 5,096,686 | A | * | 3/1992 | Vaughan et al. .............. 423/705 |
| 5,306,684 | A | | 4/1994 | Itoh |
| 5,409,682 | A | | 4/1995 | Mueller |
| 5,466,432 | A | | 11/1995 | Wallau |
| 6,355,590 | B1 | | 3/2002 | Terada |
| 2006/0088469 | A1 | * | 4/2006 | Perez-Ramirez ............. 423/701 |

FOREIGN PATENT DOCUMENTS

| | | |
|---|---|---|
| DE | 2746790 | 4/1978 |
| EP | 0104107 | 3/1984 |
| EP | 0130013 | 1/1985 |
| EP | 0534200 | 3/1993 |

OTHER PUBLICATIONS

Arean et al., "Formation and partial self-healing of lattice defects during thermal treatments of GaZSM-5: An FTIR study using CO as a probe molecule", 2001, Phys. Chem. Chem Phys., 3, pp. 1223-1227.*

Bayense et al., "The Removal of Gallium from the Lattice of MFI-Gallosilicates as studied by 71Ga M.A.A.-N.M.R. Spectroscopy", 1989, J. Chem. Soc. Chem. Commun., pp. 1292-1293.*

Centi et al. "Influence of the Preparation Methodology on the Reactivity and Characteristics of Fe—Mo—oxide Nanocrystals Stabilized inside Pentasyl-type Zeolites", Preparation of Catalysts VII, 1998, pp. 577-591.*

(Continued)

*Primary Examiner* — Elizabeth Wood
(74) *Attorney, Agent, or Firm* — Anthony A. Bisulca (57) ABSTRACT

Novel metal-containing silicates, in particular redox-active as well as crystalline silicates, a process for preparing metal-containing crystalline silicates, as well as use thereof as high-temperature oxidation catalyst or diesel oxidation catalyst. Further, a catalytic composition and a shaped catalyst body which contains the metal-containing crystalline silicates.

7 Claims, 5 Drawing Sheets

(56) References Cited

OTHER PUBLICATIONS

International Search Report of PCT/EP2009/008104 filed Nov. 13, 2009, mailed Sep. 2, 2010.

Coombs, D.S., et al., "Recommended Nomenclature for Zeolite Minerals: Report of the Subcommittee on Zeolites of the International Mineralogical Association, Commission on New Minerals and Mineral Names," The Canadian Mineralogist, vol. 35, 1997, pp. 1571-1606.

\* cited by examiner

METAL-CONTAINING CRYSTALLINE SILICATES

CROSS REFERENCE TO RELATED APPLICATIONS

This is a National Phase application of PCT application number PCT/EP2009/008104, filed Nov. 13, 2009, which claims priority benefit of German application number DE 10 2008 057 134.2, filed November, 2008, the content of such applications being incorporated herein by reference.

FIELD OF THE INVENTION

The invention relates to novel metal-containing silicates, in particular redox-active and crystalline silicates, a process for producing metal-containing crystalline silicates and use thereof as a high-temperature oxidation catalyst or diesel oxidation catalyst. The invention further relates to a catalytic composition as well as a shaped catalyst body which contains the metal-containing crystalline silicates.

BACKGROUND OF THE INVENTION

In the state of the art noble metal-containing oxidation catalysts for exhaust gas purification systems in both stationary and mobile applications are known. Oxides or oxide mixtures selected from Al—, Ti—, Ce—, La, Zr—, Sn—, W—, Y—, Pr—, Gd oxides and optionally further alkaline-earth oxides are normally used as active carrier substance. These oxides are usually applied as washcoat to ceramic or metal substrates (e.g. honeycomb bodies) and then impregnated with a noble metal solution. Alternatively the noble metal components can be applied to one or more oxides, fixed by calcining and then applied to the carrier as catalytically active washcoat. This is referred to as a "one-step process". Noble metals which are used in oxidation catalyst's are frequently Pt, Pd, Au, Ag, Rh, Re, Ir, wherein these noble metals are usually present as metal clusters.

In addition, the redox-active transition metals Mn, Fe and Cu are also frequently used in oxidation catalysts.

In the state of the art it is disadvantageous, inter alia, that in the course of their use, the metal clusters lose their optimum activity, determined by an optimum cluster size, due to ageing. In other words, due to sintering of the metal clusters of optimum size, larger clusters with reduced active surface area form. The optimum size of the active metal clusters is normally clearly smaller than the average pore size of the washcoat, which is why the metal clusters have enough room to grow onto the larger, less active clusters above a specific temperature.

Ageing can however also take place due to a reduction of the accessible surface area of the washcoat, for example by conversion of the large-surface γ-aluminium oxide to small-surface α-aluminium oxide. This reduces the accessibility for the reaction gases to the surface area and catalyst activity decreases.

Deactivation of the catalyst by poisoning, e.g. by sulphur, $SiO_2$ or other catalyst poisons is also known.

In the state of the art zeolites already coated with noble metal were therefore used in order to reduce temperature-related damage. Although zeolites form very stable structures, they can be damaged at high temperatures and in particular by the action of steam (e.g. by dealumination), which leads to a reduction of their inner surface area and involves a reduction in activity.

A further disadvantage with zeolites is that they usually have Brønsted acid centres which negatively affect the stability of the active metal clusters of oxidation state 0 which possess the highest activity for many oxidation reactions.

It would therefore be advantageous to use alternative compounds which are stable at high temperatures and prevent the metals from forming clusters.

DESCRIPTION OF THE INVENTION

The object of the present invention was therefore to circumvent the disadvantages of the state of the art, i.e. to prepare a high-temperature-stable crystalline silicate with high metal loading, with which the metal exchange can be carried out easily, but formation of metal clusters is very largely avoided.

The object is achieved by a process for producing metal-containing crystalline silicates, characterized in that a metal is introduced into a gallo-, gallo-titanium, boro- or boro-titanium silicate and the gallo-, gallo-titanium, boro- or boro-titanium silicate is calcined.

It was surprisingly found that the metal exchange can be carried out problem-free with a gallo-, gallo-titanium, boro- or boro-titanium silicate, as these have enough Brønsted acid centres due to the presence of gallium or boron. It was also surprisingly found that gallo-, gallo-titanium, boro- or boro-titanium silicates show clear degalliation at temperatures above 600° C. or deboronation above 400° C., so that the Brønsted acid centres can be removed by subsequent calcining and stabilization of metal or noble metal of oxidation state (0) is thus effected.

The metal is preferably introduced (as replacement) into the gallo-, gallo-titanium, boro- or boro-titanium silicate via an aqueous ion exchange, aqueous impregnation, an incipient wetness method or a solid-state exchange. These processes are known in the state of the art.

According to a preferred embodiment of the process according to aspects of the invention the introduction of the metal compound takes place by impregnation of the silicate material with a solution of the metal compound by means of pore volume impregnation. The silicate material is brought into contact with a quantity of solution, the volume of which corresponds to the pore volume of the silicate material used.

According to a further preferred embodiment the introduction of the metal compound takes place by aqueous ion exchange. The silicate material is suspended in water and a solution of the metal salt is added and the mixture stirred until all $H^+$ are exchanged for $M^{n+}$ ions. The silicate is then filtered off again and further processed, such as e.g. dried.

The corresponding nitrates, acetates, oxalates, tartrates, formates, amines, sulphites, carbonates, halides or hydroxides can be used as metal compounds, transition metal compounds or noble metal compounds. Complex salts, such as $M(NH_3)_n^{m+}$ salts with the same anions can therefore be used.

The metal is preferably introduced into the gallo-, gallo-titanium, boro- or boro-titanium silicate in a range of from 0.1 to 15 wt.-%, more preferably from 0.2 to 10 wt.-% and particularly preferably from 0.5 to 8 wt.-% relative to the total weight of the silicate. The metal is preferably a noble metal or transition metal, particularly preferably selected from the group comprising Pt, Pd, Au, Ag, Rh, Re, Ir, Mn and/or Cu The calcining of the gallo-, gallo-titanium or boro- or boro-titanium silicate preferably takes place at temperatures above approximately 500° C., particularly preferably from 500 to 900° C., in particular from 550 to 700° C. By calcining above 600° C. gallium or boron is removed from the crystal lattice. Boron is already removed from the crystal lattice at temperatures above 400° C., preferably above 500° C. The Brønsted acid centres are thereby simultaneously removed from the crystal lattice, with the result that the metal of oxidation state (0) is stabilized. Cluster formation does not occur, or only to a reduced extent.

According to aspects of the invention it is further preferred, that reduction with a reduction agent, e.g. hydrogen, takes place after the calcining. Conversion of the metal compound to the corresponding metal, i.e. the catalytically active metal particles takes place.

A subject of the invention is also a crystalline silicate produced according to the process described above.

The silicate within the meaning of this invention is preferably a zeolitic, silicon-rich silicate, i.e. a silicate with zeolite structure.

Suitable zeolitic silicate basic structures of the gallo-, gallo-titanium, boro- or boro-titanium silicates within the meaning of this invention are selected from the topologies AEL, BEA, CHA, EUO, FAU, FER, KFI, LTA, LTL, MAZ, MOR, MEL, MTW, LEV, OFF, TON and MFI, quite particularly preferably BEA, MFI, FER, MOR, MTW and CHA.

Zeolites or silicates which possess an Si/metal molar ratio of from 10:1 to 1500:1, preferably from 20:1 to 100:1 are to be understood as silicon-rich zeolites or crystalline silicates within the meaning of this invention.

According to the definition of the International Mineralogical Association (D. S Coombs et al, Canadian Mineralogist, 35, 1979, 1571), zeolites within the framework of the present invention are understood to be a crystalline substance from the group of aluminium silicates with a spatial network structure consisting of $SiO_4/AlO_4$ tetrahedra which are linked by common oxygen atoms to form a regular three-dimensional network.

The zeolite structure contains cavities, channels which are characteristic for every zeolite. The zeolites are divided into different structures according to their topology. The zeolite framework contains open cavities in the form of channels and cages which are normally occupied by water molecules and additional framework cations which can be exchanged. An aluminium atom attracts an excess negative charge which is compensated for by these cations. The inside of the pore system is represented by the catalytically active surface. The more aluminium and the less silicon a zeolite contains, the denser is the negative charge in its lattice and the more polar its inner surface. The pore size and structure is determined, in addition to the parameters, during production, i.e. use or type of templates, pH, pressure, temperature, presence of seed crystals, by the Si/Al ratio which accounts for the greatest part of the catalytic character of a zeolite.

Because of the presence of di- or trivalent cations as tetrahedron centre in the zeolite skeleton the zeolite receives a negative charge in the form of so-called anion sites in whose vicinity the corresponding cation positions are located. The negative charge is compensated for by incorporating cations into the pores of the zeolite material.

In a pure non-ion-exchanged zeolite it is as a rule $H^+$-ions which induce Brønsted acid properties but can also be exchanged for other $M^{n+}$-ions in the lattice. In the standard Al-containing zeolites, these trivalent cations which induce Brønsted acidity are $Al^{3+}$ ions. Accordingly pure silicates and titanium silicates contain no Brønsted acidity and no possibility of exchanging $H^+$-ions for other ions.

Although titanium silicalite TS-1 (MFI-structure) is e.g. characterized by extreme temperature stability of the lattice, ion exchange is impossible.

Zeolites are differentiated mainly according to the geometry of the cavities which are formed by the rigid network of the $SiO_4/AlO4$ tetrahedra. The entrances to the cavities are formed by 8, 10 or 12 rings and here a person skilled in the art will refer to narrow-, average- and wide-pored zeolites. Specific zeolites show a uniform structural composition (e.g. ZSM-5 or MFI topology) with linear or zig-zag channels, while in others larger cavities attach themselves behind the pore openings, e.g. in the case of the Y and A zeolites with the FAU and LTA topologies.

In crystalline gallo-aluminium silicates, in addition to silicon and aluminium atoms, trivalent gallium atoms are also incorporated into the lattice. Tetrahedra comprised of oxygen atoms form a defined system of cavities with channels and pores, wherein the characteristic properties of the zeolite are defined by the size and number of these pores.

Catalysts based on crystalline gallo-aluminium silicates are used especially in the petrochemical industry for producing organic synthesis products. Due to their dehydrogenation and cyclization properties they are suited to converting low hydrocarbons such as alkanes from liquefied petroleum gas (LPG) to aromatic hydrocarbons such as benzene, toluene or xylenes (so-called dehydrocyclodimerization).

On the other hand, in zeolitic gallo-silicates all the aluminium atoms are replaced by gallium. Correspondingly, in zeolitic boro-silicates the aluminium atoms are replaced by boron. In gallo-titanium silicates the aluminium atoms are replaced by gallium and some of the silicon atoms by titanium. In boro-titanium silicates the aluminium atoms are replaced by boron and some of the silicon atoms by titanium.

The gallo-silicates used according to aspects of the invention can for example be obtained by hydrothermal crystallization of a synthesis gel. For this, a silicon source (e.g. $SiO_2$) and a gallium source (e.g. $GaCl_3$) are usually crystallized in alkaline solution (e.g. NaOH, $NH_3$) for several days. The addition of a structure-directing template, for example of tetraalkyl ammonium compounds, usually proves advantageous.

Processes for preparing gallo-silicates are for example described in U.S. Pat. No. 5,466,432. On this basis according to aspects of the invention a silicon-rich gallo-silicate is produced by hydrothermal crystallization of a synthesis gel. The hydrothermal crystallization is preferably carried out over 6 to 48 hours at a temperature of 100 to 250° C.

As already stated, the hydrothermal crystallization is preferably carried out in the presence of an organic template. Suitable templates are for example tetrapropyl ammonium hydroxide, tetrapropyl ammonium bromide, tetraethyl ammonium hydroxide and tetraethyl ammonium bromide.

Boro-silicates are similarly accessed, by exposing a silicon source (e.g. $SiO_2$) and a boron source (e.g. $BCl_3$) in alkaline solution to hydrothermal crystallization. Here also the use of a template, e.g. a tetraalkyl ammonium compound, is advantageous. A process for preparing boro-silicates is found for example in EP 0 534 200 A1.

The gallo-titanium silicate is produced in analogous manner to gallo-silicate, by hydrothermally crystallizing a gallium source, a titanium source and a silicon source in the presence of a structure-directing agent. For example, $Ga_2O_3$ can be used as gallium source, $TiO_2$ as titanium source and $SiO_2$ as silicon source. A tetraalkyl ammonium compound, for example tetrapropyl ammonium hydroxide, tetrapropyl ammonium bromide, tetraethyl ammonium hydroxide and tetraethyl ammonium bromide can again be used as a structure-directing agent (template). Suitable titanium-containing zeolite structures are e.g. MFI (TS-1) and other titanium silicates, for example ETS structures. The boro-titanium silicate is similarly synthesized, however with a boron source instead of a gallium source.

When using organic templates they must be removed again after the zeolite synthesis or silicate synthesis. This usually takes place by burn-out of the template at temperatures of above 400° C., preferably 400 to 500° C. According to aspects of the invention it must be ensured that this does not result in degalliation or deboronation. This can for example be done by checking via $NH_4TPD$ (temperature programmed desorption of ammonium). In the process according to aspects of the invention it is thus preferred that, before the introduction of the metal into the gallo-silicate, gallo-titanium silicate, boro-silicate or boro-titanium silicate, the corresponding starting silicate is thermally treated at maximum temperatures of from 400 to 500° C. The thermal treatment effects removal of the organic template components, without causing degalliation or deboronation.

Only then do the metal exchange and the calcining take place as described above and thus lead to the metal-containing silicates according to aspects of the invention.

A subject of the invention is thus also a metal-containing crystalline silicate, wherein the metal is present in the silicate substantially in oxidation state (0). "Substantially" means more than 90%, preferably more than 95%, particularly preferably more than 99% of the metal is present in oxidation state (0).

The metal-containing silicate is further characterized in that the silicate is substantially free of Brønsted acid centres. The noble metal-containing silicate is further characterized in that it shows a signal in the IR spectrum for an adsorbed CO molecule at approximately $2088\pm15$ cm$^{-1}$ and at $2073\pm15$ cm$^{-1}$. The silicate according to aspects of the invention further shows in the IR spectrum CO to SiOH oscillation signals at $2156\pm15$ cm$^{-1}$ and for the Si—Ga oscillation at $2171\pm15$ cm$^{-1}$.

The metal-containing silicate contains the metal in the range of from 0.1 to 15 wt.-%, more preferably from 0.2 to 10 wt.-% and particularly preferably from 0.5 to 8 wt.-%, relative to the total weight of the silicate.

Suitable zeolitic basic silicate structures of the gallo-, gallo-titanium, boro- or boro-titanium silicates within the meaning of this invention are selected from the topologies AEL, BEA, CHA, EUO, FAU, FER, KFI, LTA, LTL, MAZ, MOR, MEL, MTW, LEV, OFF, TON, MFI and ETS, quite particularly preferably BEA, MFI, ETS, FER, MOR, MTW and CHA.

The metal-containing crystalline silicate according to aspects of the invention is either an aluminium-free silicate, or silicon-rich zeolites. Within the meaning of this invention zeolites which possess an Si/metal-molar ratio of from 10:1 to 1500:1, preferably from 20:1 to 500:1 are to be understood as silicon-rich zeolites. Within the meaning of this invention aluminosilicates in which not all the aluminium is replaced by gallium, boron and/or titanium, for example gallo-aluminium-silicates, boro-aluminium-silicates and the like are also preferred.

A subject of the invention is also the use of the metal-containing silicate according to aspects of the invention as high-temperature oxidation catalyst or as diesel oxidation catalyst.

Due to its high temperature stability and due to the property that the metal does not tend towards cluster formation, the metal-containing zeolite or the metal-containing crystalline silicate according to aspects of the invention is eminently suitable as high-temperature oxidation catalyst, in particular as diesel oxidation catalyst. When used as diesel oxidation catalyst it is furthermore possible to exploit the advantage that the zeolitic structure serves simultaneously as a cold-start trap for unburned hydrocarbons which are adsorbed at low temperatures at which the oxidation effect of the catalyst is not yet high enough, and are then desorbed at higher operating temperatures, i.e. when the oxidation effect of the catalyst is optimal.

A subject of the invention is furthermore a catalytic composition which contains the metal-containing crystalline silicate defined above. The catalytic composition contains the metal-containing crystalline silicate preferably in a quantity of from 5 to 70 wt.-%, more preferably from 10 to 50 wt.-%, particularly preferably from 15 to 50 wt.-% (relative to the total mass of the catalytic composition).

The catalytic composition can also contain further metal oxides, binders, promoters, stabilizers and/or fillers.

The metal-containing crystalline silicate according to aspects of the invention or the catalytic composition which contains the metal-containing crystalline silicate according to aspects of the invention can therefore be processed to form a washcoat which is suitable for coating catalyst supports or shaped catalyst bodies. The washcoat preferably comprises from 5 to 70 wt.-%, more preferably from 10 to 50 wt.-%, particularly preferably from 15 to 50 wt.-% of the silicate according to aspects of the invention.

A subject of the invention is thus also a shaped catalyst body containing the metal-containing crystalline silicate according to aspects of the invention or the catalytic composition according to aspects of the invention.

Particularly preferably the metal-containing crystalline silicate or the catalytic composition is present as coating on the shaped catalyst body.

Ceramic or metal honeycomb bodies (monoliths) are for example suitable as shaped catalyst bodies which can be coated with the washcoat. Application to the shaped catalyst body can be carried out according to methods known in the state of the art by dipping, spraying or the like.

Alternatively the catalytic composition can also be processed in known manner into shaped bodies such as tablets and extrudates adding suitable auxiliaries such as inorganic binders (e.g. silica sol), pore formers, plasticizers and moisteners. However the catalytic composition is preferably applied in the form of a coating (as washcoat) to the inner walls of the flow channels of metallic or ceramic honeycomb bodies (monoliths).

Coating quantities of from 50 to 300 g/l volume of the honeycomb body are advantageous for the purification exhaust gas from diesel engines. The required coating techniques are known to a person skilled in the art. Thus for example the catalytic composition is processed to form an aqueous coating dispersion. Silica sol for example can be added to this dispersion as binder. The viscosity of the dispersion can be adjusted by suitable additives, with the result that it is possible to apply the required coating quantity to the walls of the flow channels in a single step. If this is not possible, the coating can be repeated several times, wherein the freshly applied coating is fixed each time by intermediate drying. The finished coating is then dried at increased temperature and calcined at temperatures of from 300° C. to 600° C. for 1 to 4 hours.

EXAMPLES

The invention will now be explained in more detail with reference to some non-limiting embodiment examples.

Embodiment Examples

Example 1

Production of a gallo-silicate (according to U.S. Pat. No. 5,466,432):

Colloidal silica gel (6.615 g, containing 2.778 g of $SiO_2$) is homogenized with 1.723 g of tetrapropyl ammonium bromide (TPABr), 0.45 g of $GaCl_3$ solution (contains 0.067 g of gallium) and 3.238 g of hexamethylene tetramine (HMT) in 25 g of water accompanied by stirring for 94 minutes. The reaction mixture with the molar ratios $H_2O/SiO_2=30$, $SiO_2/Ga_2O_3=92$, $HMT/SiO_2=0.5$, $TPABr/SiO_2=0.14$ is transferred to a Teflon-coated autoclave with a capacity of 50 ml and reacted for four days at 453° Kelvin and the pressure that forms during the process. After filtration and washing with water approximately 2 g of a crystalline gallo-silicate is obtained. The gallo-silicate is then thermally treated at temperatures above 400° C. in order to remove the organic template. It is then checked by temperature-programmed desorption of ammonium that no degalliation takes place.

Aqueous impregnation with platinum then takes place. The gallo-silicate is then dried and calcined at temperatures above 600° C. (from 650 to 700° C.). This leads to complete removal of the gallium from the lattice. A further reduction with hydrogen follows in order to activate the noble metal-containing silicate formed. The platinum loading is 2%, relative to the total weight of the silicate.

Example 2

Figure 1:
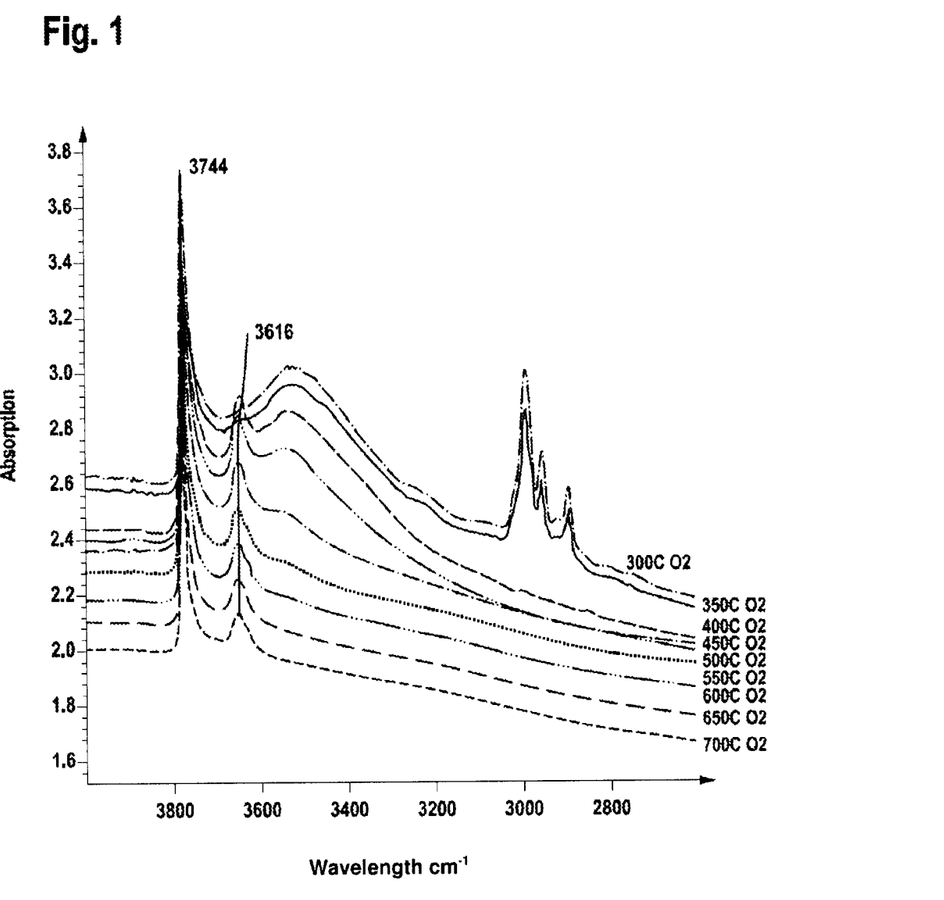
FIG. 1 is an IR spectrograph from the determination of the decomposition temperature of tetraalkylammonium ions in the production of a gallo-titanium silicate (Ga-TS-1) according to Example 2.

Production of a gallo-titanium silicate (Ga-TS-1):

132.3 g of water, 233.6 g of a tetrapropyl ammonium hydroxide solution (0.4%), 6 g of $Ga(NO_3)_3.8H_2O$, 212.6 g of tetraethoxysilane (0.98% Si) and 7 g of tetraethyl titanate (0.95% Ti) are introduced into a stirred autoclave. The autoclave is then sealed, raised to a temperature of 140° C. over a heating-up period of 12 hours and kept there for 71 hours. In the process the pressure rises to 21 bar. The product is flocculated by adding flocculating agent, filtered off, washed and dried. It is then determined in a series with IR spectroscopy, that the decomposition of the tetraalkyl ammonium ion is completed at 400° C. or above (FIG. 1 Removal of the tetraalkyl ammonium ions at 400° C.) and the product is then correspondingly calcined at 400° C.

Figure 2:
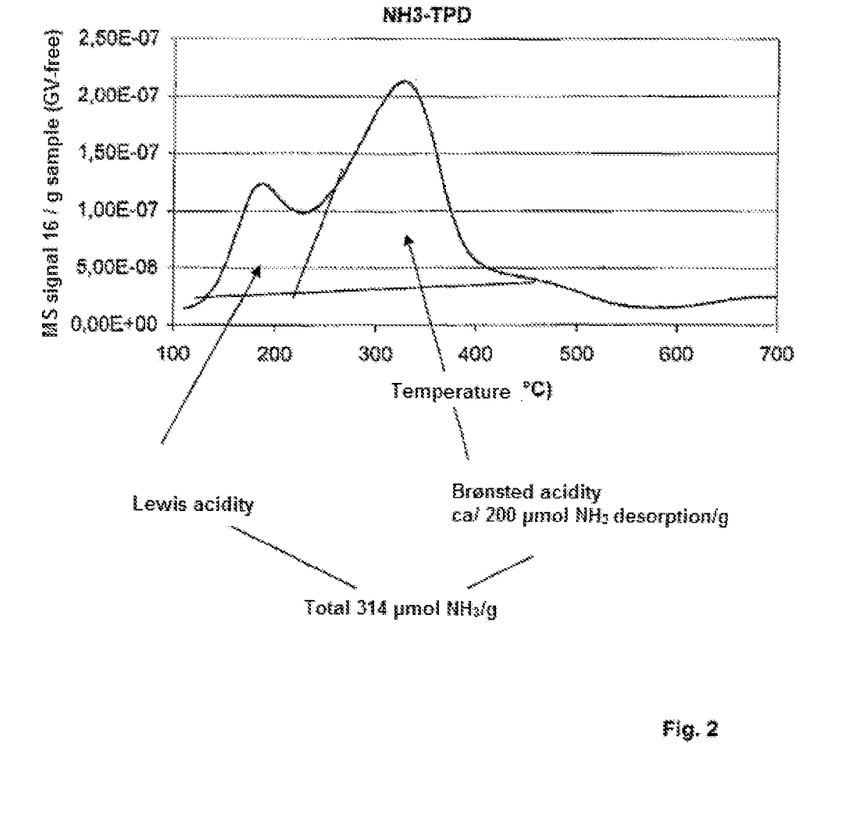
FIG. 2 plots the temperature-programmed desorption of ammonia (ammonia TPD) from the Ga-TS-1 material in Example 2.

Ion exchange with $Pt(NH_3)_4(OH)_2$ solution:

An ammonia TPD (temperature-programmed desorption) of the just-produced Ga-TS-1 zeolite is measured (see FIG. 2). This shows a large peak for Brønsted acid centres (W) to which $NH_3$ is bound and desorbed with a peak maximum at 330° C. A standardization of the detected quantity of ammonia over the entire peak area results in 314 μmol of $NH_3$/g adsorption. An approximate evaluation of the Brønsted acidity peak at the higher temperature results in approximately 200 μmol of $H^+$. It should therefore be possible to exchange approximately 200 μmol of $H^+$ for 100 μmol of $Pt^{2+}$.

35 g of the thus-produced Ga-TS-1 powder is therefore suspended in 350 ml of water. 4.25 g of $Pt(NH_3)_4(OH)_2$ solution (16.04%) is added to this suspension and the mixture stirred for 18 hours, followed by filtration and drying. The powder is calcined in an oven at 550° C. for 3 hours.

The product contains 2.2% platinum.

Figure 3:
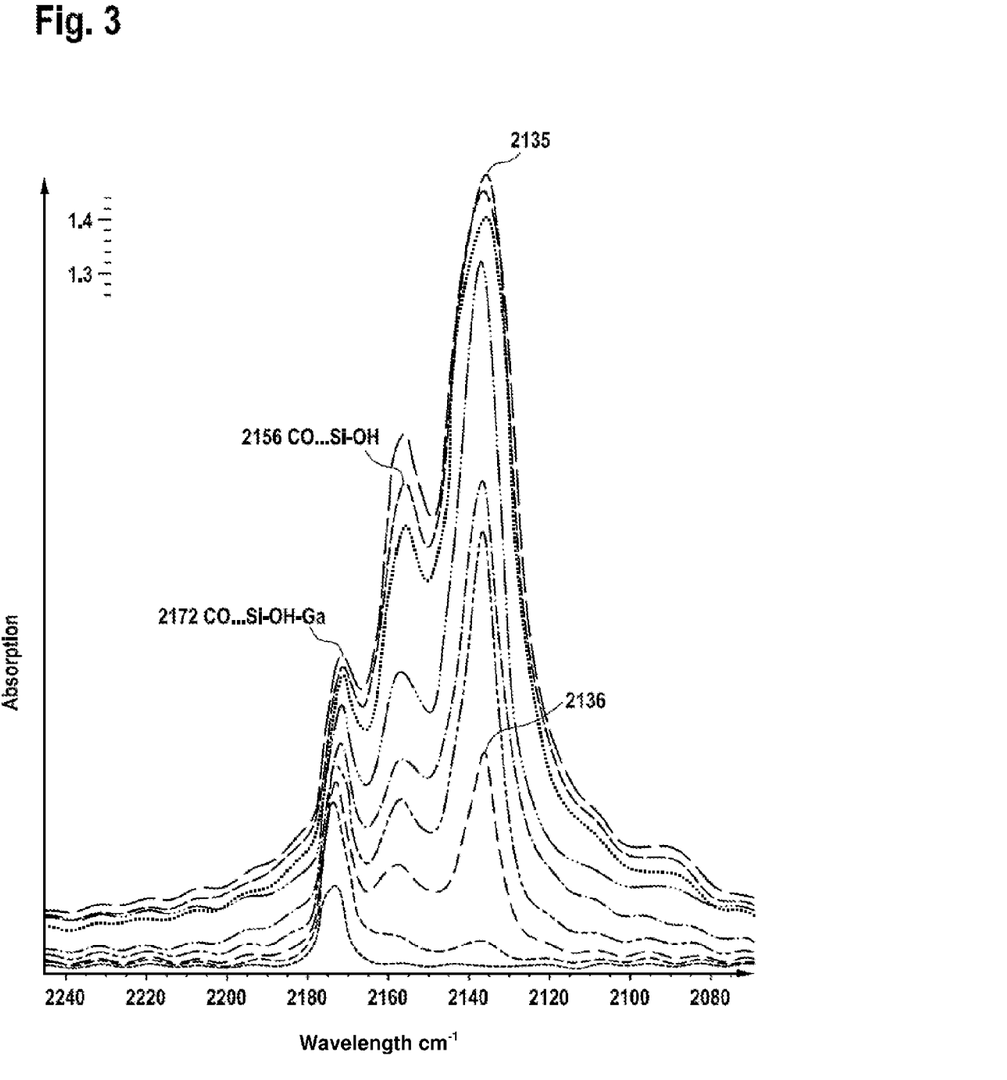
FIG. 3 is an IR spectrograph of a carbon monoxide-loaded Pt—Ga-TS-1 material produced according to Example 2.

FIG. 3 shows an IR spectrum of the product after loading with carbon monoxide at 77° K which is slowly rinsed with He. The CO oscillations for CO to SiOH (2156 $cm^{-1}$) and for Si—Ga at 2171 $cm^{-1}$ can be seen. It can be clearly seen that after calcining at 550° C. many Ga ions still leaving acidity in the zeolite are still present in the zeolite.

Figure 4:
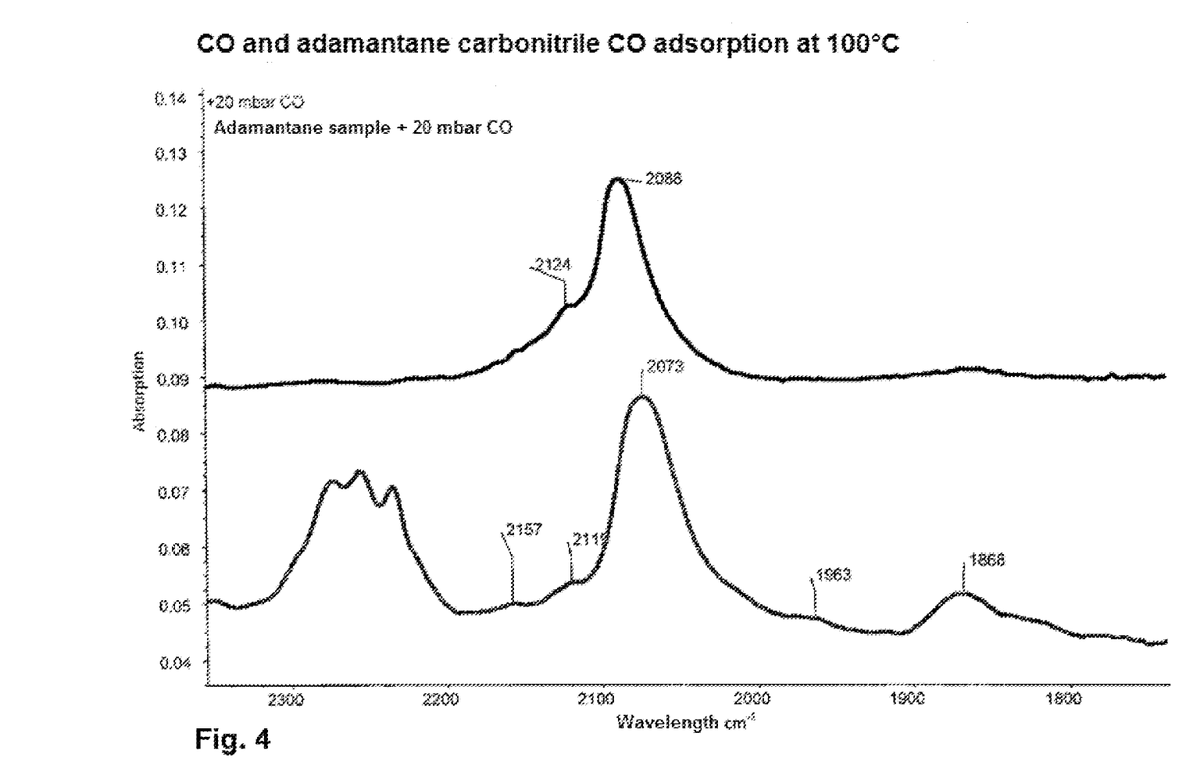
FIG. 4 is an IR spectrograph of carbon monoxide adsorption on the Pt—Ga-TS-1 material of Example 2 with and without prior adsorption of adamantane nitrile.

FIG. 4 shows, in the upper IR spectrum under CO at 20 mbar, a signal at 2088 $cm^{-1}$ which is assigned to CO absorbed on Pt(0) clusters. The question of whether these are situated in the zeolite can be solved by adding a strong bulky ligand. Adamantane nitrile is so large that it does not enter the zeolite pores. Adsorption of adamantane nitrile before the addition of CO should thus markedly impair the CO adsorption on large clusters outside the zeolite.

The lower spectrum in FIG. 4 shows the CO adsorption after adamantane nitrile adsorption. The signals of the adsorbed adamantane nitrile can be seen in the range of from 2200-2300 $cm^{-1}$. Due to the steric demand, there is space on the large clusters between the nitriles for some CO molecules which are arranged bridging 2 Pt atoms. These show weak absorption at 1868 $cm^{-1}$. The fact that the intensity of the main peak now at 2073 $cm^{-1}$, which is also to be assigned to CO on Pt(0) clusters, has hardly become smaller, (max. adsorbance 0.85 compared with 0.125), suggests that a substantial part of the platinum atoms available for the CO adsorption on the surface of clusters is found in the pores and is not blocked by adamantane nitrile adsorption.

This Pt—Ga-TS-1 material can now be varied by calcining. If a high hydrocarbon adsorption of the zeolites is desired for a hydrocarbon storage function in a DOC, the zeolite can be added after calcining at 550° C. If a very good CO oxidation is desired, a high tendency of the platinum towards Pt(0) is required. For this, migration of the gallium from the lattice must then be triggered above 600° C. (approximately 700° C.). The acid centres in the zeolite and the reoxidation tendency of the platinum are thereby reduced, but the storage capacity for hydrocarbons is also reduced as a result.

Figure 5:
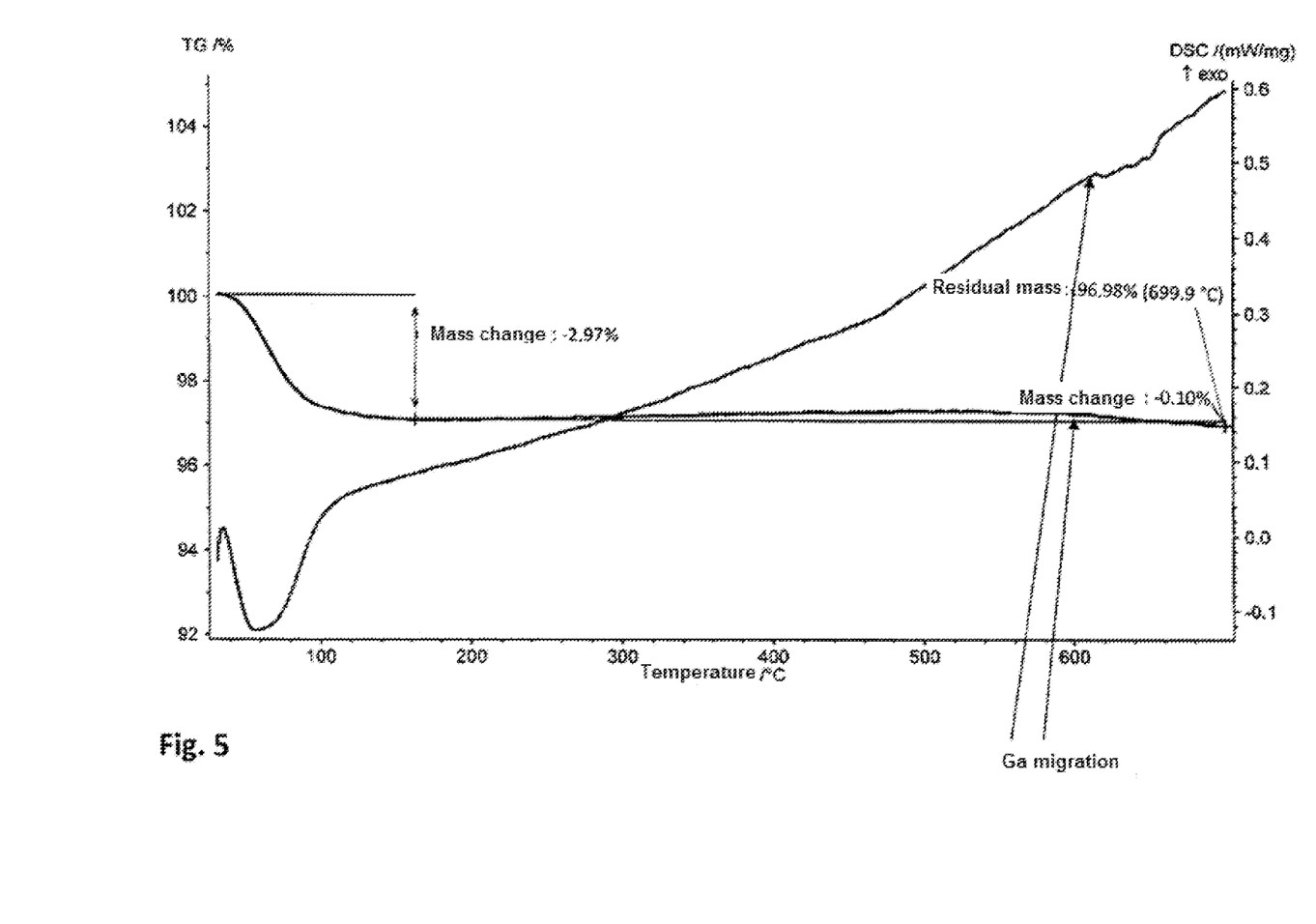
FIG. 5 is a Thermogravimetric Analysis—Differential Scanning calorimetry (TGA-DSC) diagram of a Ga-TS-1 material without platinum.

FIG. 5 shows a TGA-DSC (Thermogravimetric Analysis—Differential Scanning calorimetry) diagram of Ga-TS-1 without platinum.

It can be clearly seen that above 600° C. very little mass is lost and a slightly endothermic heat absorption signal can be seen. Here the gallium migrates from the zeolite lattice. A small proportion sublimates away, the greatest part migrates to the outsides of the zeolite and remains there as $Ga_2O_3$.

With this method platinum is brought into a zeolite structure which withstands more than 1000° C. in its structure.

Comparison Example

Titanium silicalite TS-1 is a known extremely thermo-stable zeolite, the structure of which remains even following thermal treatment above 1000° C. Its production is described e.g. in U.S. Pat. No. 4,410,501.

35 g of this TS-1 powder is suspended in 350 mL of water and the mixture is stirred. 4.25 g of a platinum tetramine hydroxide solution (16.04% Pt) is added to this suspension and the mixture is stirred overnight. The zeolite is filtered off and dried. The Pt content of the powder is analyzed for and, according to analysis, contains less than 0.2% platinum, which shows that without Brønsted acid centres there is no ion exchange.

The invention claimed is:

1. A process for preparing metal-containing crystalline silicates, wherein a metal is introduced into a gallo-silicate, gallo-titanium silicate, boro-silicate or boro-titanium silicate and the gallo-silicate, gallo-titanium silicate, boro-silicate or boro-titanium silicate is then calcined at temperatures above 600° C., wherein gallium or boron is removed from the crystal lattice, wherein the silicate has a zeolite structure, the topology is selected from the group consisting of AEL, BEA, CHA, EUU, FAU, FER, KFI, LTA, LTL, MAZ, MOR, MEL, MTW, LEV, OFF, TON and MFI and the metal is a noble metal or transition metal, wherein the metal is introduced into the gallo-, gallo-titanium-, boro- or boro-titanium silicate via an aqueous ion exchange, aqueous impregnation, incipient wetness method or solid-state exchange.

2. The process according to claim 1, wherein the metal is introduced into the gallo-silicate, gallo-titanium silicate, boro-silicate or boro-titanium silicate in a quantity of from 0.1 to 15 wt.-%.

3. The process according to claim 1, wherein the metal is selected from the group consisting of Pt, Pd, Au, Ag, Rh, Re, Ir, Mn, Fe and/or Cu.

4. The process according to claim 1, wherein reduction with hydrogen takes place after the calcining.

5. The process according to claim 1, wherein the metal is present in the silicate substantially in oxidation state (0).

6. The process according to claim 5, wherein the silicate is free of Brønsted acid centers.

7. The process according to claim 6, wherein the silicate comprises the metal in the range of from 0.1 to 15 wt.-%.

* * * * *